(12) United States Patent
Ward

(10) Patent No.: US 6,935,613 B1
(45) Date of Patent: Aug. 30, 2005

(54) COMPACT INTEGRATED FLANGED ISOLATOR BALL VALVE

(75) Inventor: Leslie M. Ward, Arlington, TX (US)

(73) Assignee: Oslin Nation Co., Dallas, TX (US)

( * ) Notice: Subject to any disclaimer, the term of this patent is extended or adjusted under 35 U.S.C. 154(b) by 0 days.

(21) Appl. No.: 10/379,631

(22) Filed: Mar. 5, 2003

Related U.S. Application Data

(60) Provisional application No. 60/362,099, filed on Mar. 5, 2002.

(51) Int. Cl.$^7$ .......................... F16K 51/00; F16L 29/00
(52) U.S. Cl. .................. 251/148; 251/153; 251/315.06
(58) Field of Search ................................ 251/148, 153, 251/315.01, 315.06; 137/375

(56) References Cited

U.S. PATENT DOCUMENTS

| | | | |
|---|---|---|---|
| 2,825,527 A | 3/1958 | Wendell | 251/96 |
| 2,916,254 A | 12/1959 | Wendell | 251/172 |
| 3,211,421 A | 10/1965 | Johnson, Jr. et al. | 251/315 |
| 3,744,755 A * | 7/1973 | Gary et al. | 251/309 |
| 4,089,345 A * | 5/1978 | Eberhardt | 137/596.2 |
| 4,118,009 A | 10/1978 | Chmura | 251/315 |
| 4,214,604 A | 7/1980 | Rumsey | 137/375 |
| 4,280,526 A | 7/1981 | Gonzalez | 137/315 |
| 4,336,919 A | 6/1982 | Hall | 251/214 |
| 4,342,444 A | 8/1982 | Sonderman | 251/315 |
| 4,523,740 A | 6/1985 | Paitchell | 251/315 |
| 4,553,562 A | 11/1985 | Nakada | 137/375 |
| 4,660,591 A | 4/1987 | Brown et al. | 137/312 |
| 4,807,669 A * | 2/1989 | Prestidge, Sr. | 138/178 |
| 4,911,408 A | 3/1990 | Kemp | 251/174 |
| 5,201,493 A | 4/1993 | Kim | 251/315 |
| 5,755,427 A * | 5/1998 | Koskinas | 251/188 |
| 5,840,016 A * | 11/1998 | Kitano et al. | 600/159 |
| 5,845,943 A * | 12/1998 | Ramacier et al. | 285/12 |
| 5,915,402 A | 6/1999 | Mitchell, II | 137/15 |
| 5,938,173 A * | 8/1999 | Hayakawa | 251/214 |
| 2001/0008276 A1 | 7/2001 | Assenheimer | |

* cited by examiner

Primary Examiner—Edward K. Look
Assistant Examiner—John K. Fristoe, Jr.
(74) Attorney, Agent, or Firm—Conley Rose, P.C.; Michael W. Piper

(57) ABSTRACT

The present invention provides a flanged ball valve device which can be connected, as an integrated compact unit, to a pump at the valve flange end of the device by means of an integral flange and to various types of piping systems at the pipe end of the device by means of a pipe connector attached to the integrated valve housing of the device. The integral flange of the device is compatible with a variety of different sized pump flanges by virtue of a plurality of slotted bolt holes present in the integral flange. The valve handle provided in the present invention for opening and closing the spherical valve ball valve of the device is preferably U-shaped, thereby allowing increased surface area for insulation material of relative thickness to be wrapped around the integrated valve housing without disturbing handle rotation or covering the handle from view.

20 Claims, 4 Drawing Sheets

US 6,935,613 B1

COMPACT INTEGRATED FLANGED ISOLATOR BALL VALVE

CROSS-REFERENCE TO RELATED APPLICATIONS

This patent application claims priority to U.S. Provisional application Ser. No. 60/362,099, filed Mar. 5, 2002.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The field of the present invention relates generally to flange and ball assemblies.

BACKGROUND OF THE INVENTION

It can be appreciated that flange and ball assemblies have been in use in connection with a variety of pump and plumbing applications for many years. Typically, ball and flange assemblies are comprised of components assembled by means of threaded or soldered parts including a flange adapter, a ball valve, along with various pipe nipples and other pipe couplings.

Conventional flange and ball assemblies provide a flange mechanically connected to the pump flange by a series of bolts. The flange is also connected to a ball valve via pipe fittings, usually in the form of a pipe nipple. The ball valve connects to the overall piping system by use of appropriately threaded pipe fittings.

One problem with conventional flange and ball assemblies is that such assemblies typically required the use of numerous individual components, rather than the use of a single integrated unit. Use of multiple individual components in conventional flange and ball assemblies produces a risk of developing leaks upon installation, thereby causing damage to property. Another problem with conventional flange and ball assemblies are that the flanges typically have bolt hole patterns fitting only one specific pump flange size, therefore limiting the compatibility of a particular flange. Conventional flange and ball assemblies also require significant labor and time to assemble and use, leading to an increase in cost, as compared to reduced labor and time required for use of an integrated unit. Also, a flange and ball assembly made up of several individual components results in a physically and dimensionally larger device as compared to a compact integrated unit. Larger assemblies take up more room in the usually limited space allocated to plumbing equipment inside buildings. Known flange and ball assemblies also have valve handles connected directly to the valve housing thereby limiting available space for insulation material to be installed around the valve body.

SUMMARY OF THE INVENTION

One embodiment of the present invention provides a flanged ball valve device. This embodiment includes a valve housing having a flange end, a pipe end, and a stem opening in the valve housing in between the pipe end and the flange end. A flange is integrally formed on the flange end of the valve housing. In this embodiment the flange has slotted openings capable of connection with a plurality of differently oriented attachment openings on connecting pump devices. A spherical ball valve member within the valve housing has a central bore and is capable of moving to an open or closed position, thereby allowing or blocking passage of fluid through the spherical ball valve member. A valve stem is coupled to the spherical ball valve member and extends out of the stem opening in the valve housing. A valve handle is coupled to the valve stem for rotating the spherical ball valve member into an open or closed position.

In some embodiments, there is a pipe connector on the pipe end of the valve housing integrally formed with the valve housing, where the pipe connector is compatible with a variety of piping systems which may include any or all of the following: threaded type pipe fittings, barbed type pipe fittings (often used for flexible hoses), and solder ended type pipe fittings.

In some embodiments, the spherical ball valve member is an integral full-port ball valve and the valve stem is a blow-out proof stem. The blow-out proof stem is preferably sealed with a double o-ring stem seal, but may use seals of other types known in the art.

Another embodiment includes a valve housing having a flange end, a pipe end, and a stem opening in the valve housing in between the pipe end and the flange end. A flange is integrally formed on the flange end of the valve housing. A spherical ball valve member within said integrated valve housing has a central bore and is capable of moving to an open or closed position, thereby allowing or blocking passage of fluid through the spherical ball valve member. A valve stem is coupled to the spherical ball valve member and extends out of the stem opening in the valve housing. A U-shaped valve handle is coupled to the valve stem for rotating the spherical ball valve member into an open or closed position. In various versions of this embodiment, the U-shaped valve handle has at least two rise sections each having rise angles of at least about 75 degrees, has at least two rise sections each having rise angles of between 75 degrees and 90 degrees, and/or has at least two rise sections each having about the same rise angle.

DETAILED DESCRIPTION OF THE INVENTION

Figure 1:
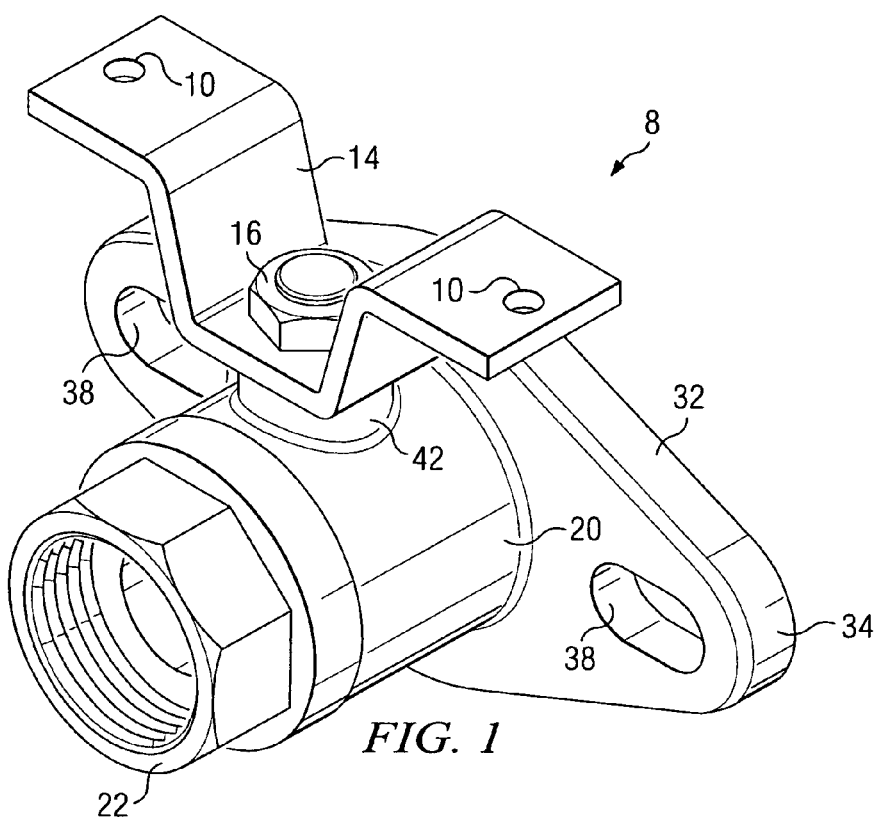
FIG. 1 is a perspective view of the pipe end of the device depicting a threaded pipe connector, the valve housing, the valve handle, and the flange.

The following detailed description in connection with the accompanying drawings discloses various embodiments of the flanged ball valve device wherein like reference numerals have been applied to like elements. Corresponding numerals and symbols in the different figures refer to corresponding parts unless otherwise indicated.

The present disclosure addresses a flanged ball valve device which can be connected to a pump at the flange end of the device by means of a flange integrally formed with the valve housing and to various types of piping systems at the pipe end of the device by means of a pipe connector attached to the valve housing of the device. The flange of the device is compatible with a variety of different sized or configured pump flanges by virtue of a plurality of slotted bolt holes present in the flange. One valve handle provided in the present disclosure for opening and closing the spherical valve ball valve of the device is U-shaped, thereby allowing maximal surface area for insulation material of relative thickness to be wrapped around the integrated valve housing without disturbing handle rotation or covering the handle from view. In one embodiment, the ball valve device of the present disclosure relates to isolator ball valves which serve as a connection between pumps for building services water circulation or pressure boosting and numerous types of building piping systems. These compact integrated units may provide any of a number of advantages in that type of application. Other implementations of ball valve devices recognized by those of skill in the art may also be able to use some or all of the disclosed advantages of the present disclosure.

Figure 2:
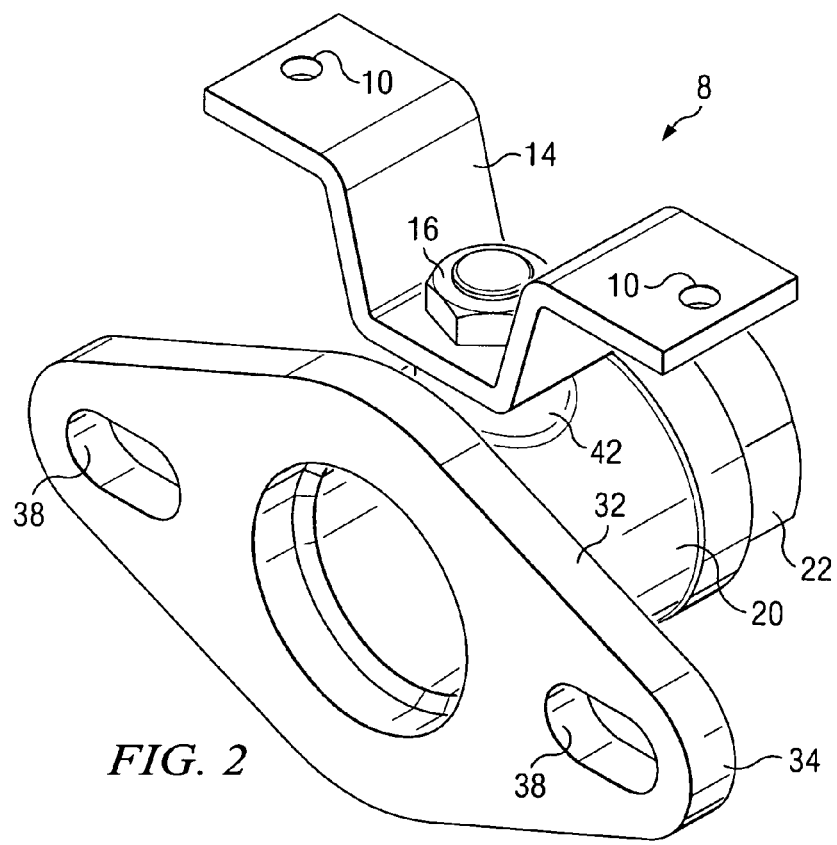
FIG. 2 is a perspective view of the valve flange end of the device depicting the flange, the valve housing, the valve handle, and the pipe connector of the device.
Figure 4:
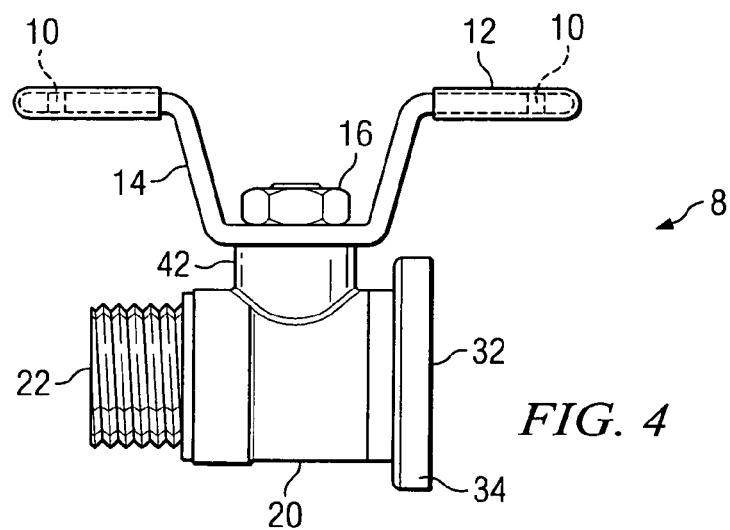
FIG. 4 is a side view of the device showing a solder end pipe connector on the pipe end of the device.
Figure 5:
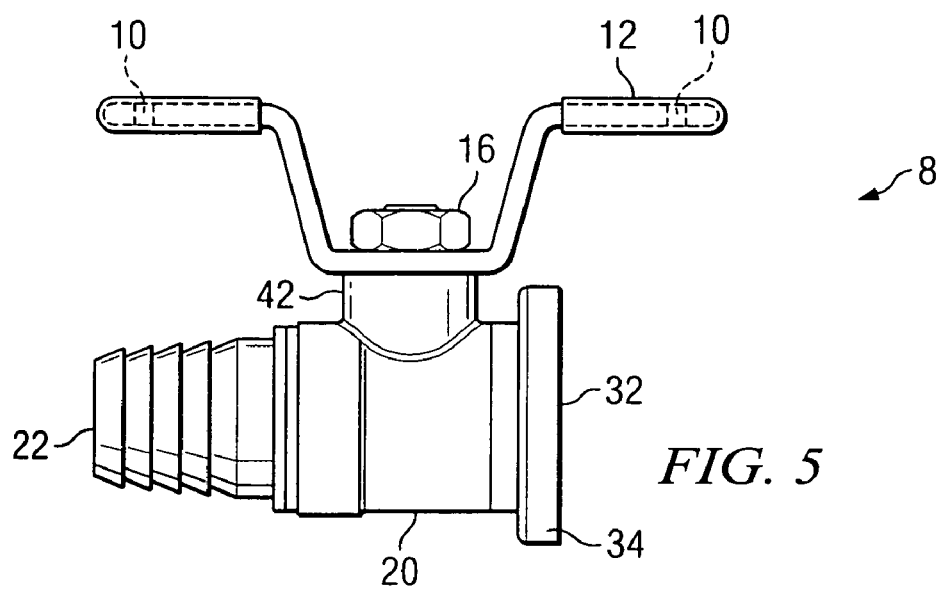
FIG. 5 is a side view of the device showing a barbed pipe connector on the pipe end of the device.

Several alternate embodiments of the device are illustrated in the various figures. In FIG. 1 and FIG. 2, the flanged ball valve device is seen in its entirety and is generally referred to by reference number 8. One embodiment of the present disclosure provides a full-port design of the flanged ball valve device 8 which includes a spherical ball valve member 28, visible in the cross-sectional view of FIG. 3. Spherical ball valve member 28 is situated within the valve housing 20 which has an integral flange 34 on the valve flange end 32 of valve housing 20 and a pipe connector 22 on the pipe end 36 of valve housing 20. Valve handle 14 connected to valve housing 20 is the means by which spherical ball valve member 28 can be opened and closed. Valve handle 14 is coupled to the valve stem 26 which is coupled to spherical ball valve member 28. Valve housing 20 of the present invention is designed so that the flange end 32 of said housing is terminated in the shape of flange 34 which can be bolted to a variety of different sized or oriented pump flanges. In one embodiment, as shown in FIG. 4 and FIG. 5, pipe end 36 of valve housing 20 terminates in pipe connector 22 which is compatible with a variety of types of pipe connections. Alternate embodiments may use a more specifically tailored pipe connector 22 compatible with only a couple or one of the various types of pipe connections.

Figure 6:
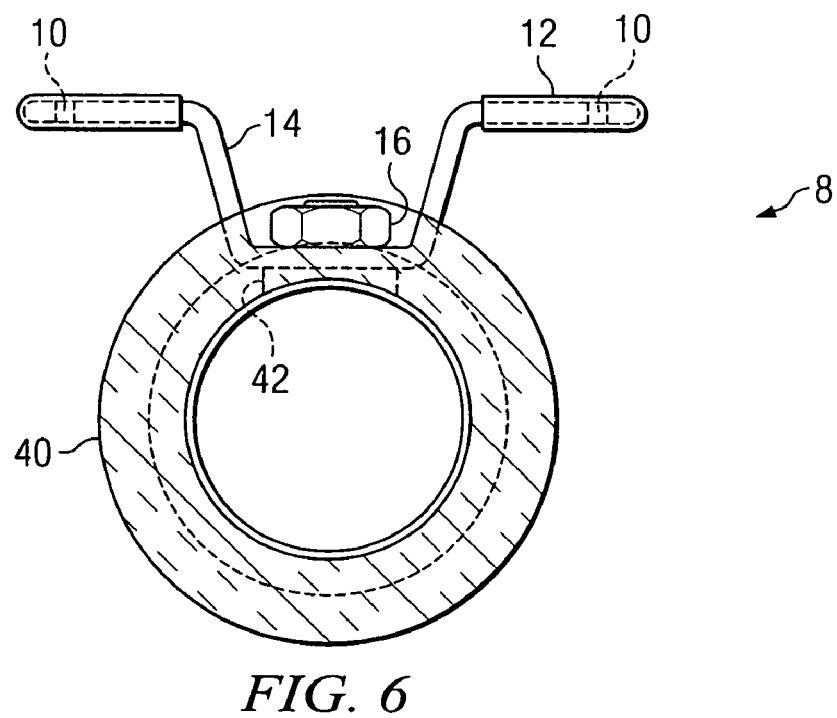
FIG. 6 provides an end view of the device showing insulation wrapped around the valve housing.
Figure 7:
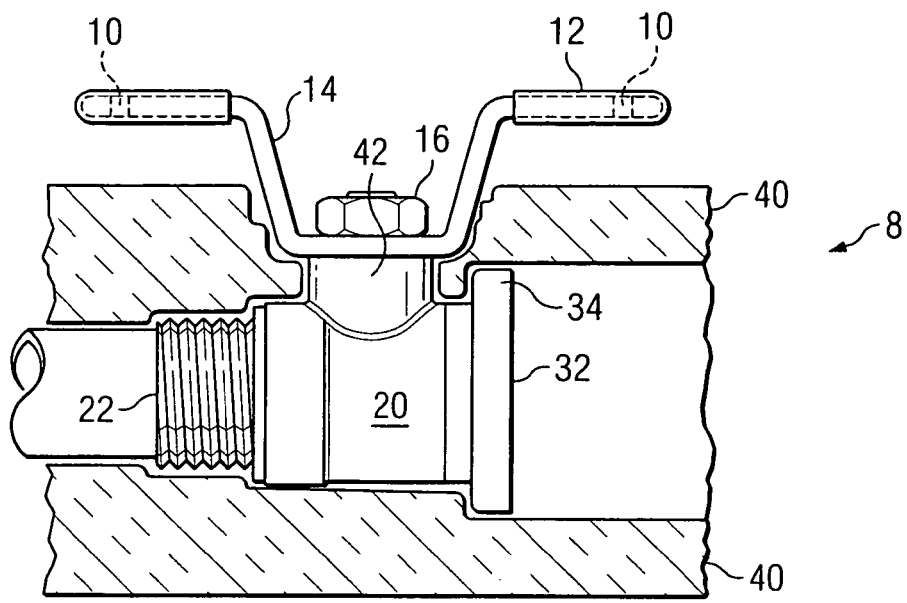
FIG. 7 provides a side cross-sectional view of the device depicting insulation material wrapped around the valve housing of the device in addition to providing an indication of the thickness of such insulation material.
Figure 8:
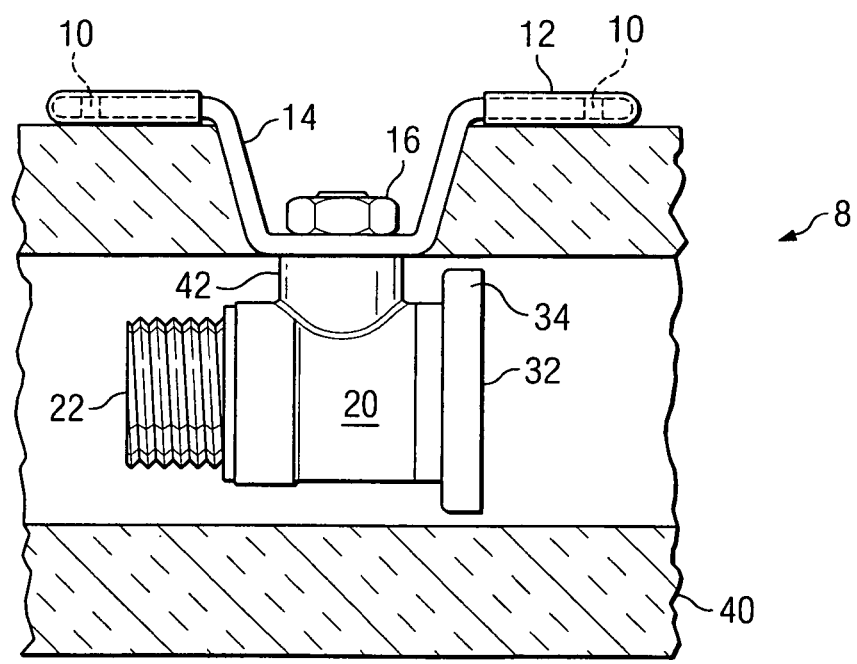
FIG. 8 provides a close-up side cross-sectional view of the device depicting insulation material wrapped around the valve housing of the device in addition to providing an indication of the thickness of such insulation material.

Spherical ball valve member 28 has a central bore through which passage of fluid may be allowed or blocked by operation of valve handle 14. The spherical ball valve member 28 is capable of being rotated between open and closed positions by means of valve handle 14 acting through valve stem 26. In one embodiment, valve handle 14 is U-shaped, such shape minimizing the dimensional space (commonly known in the industry as a "footprint") occupied by valve handle 14. In alternate embodiments, T-shaped handles, V-shaped handles, flat handles, single or paired handles, wheels, or other handle elements recognized by those of skill in the art may be employed. Referring to FIG. 6–FIG. 8, it can be seen that the U-shape of valve handle 14 allows space for a considerable thickness of insulation material 40 to be wrapped around the integrated valve housing 20 without disturbing rotation of valve handle 14 or covering valve handle 14 from view. The amount of available surface area on the integrated valve housing 20 of the present invention is considerably greater than would be available if a non-U-shaped handle leaving a significantly larger "footprint" was utilized.

Figure 3:
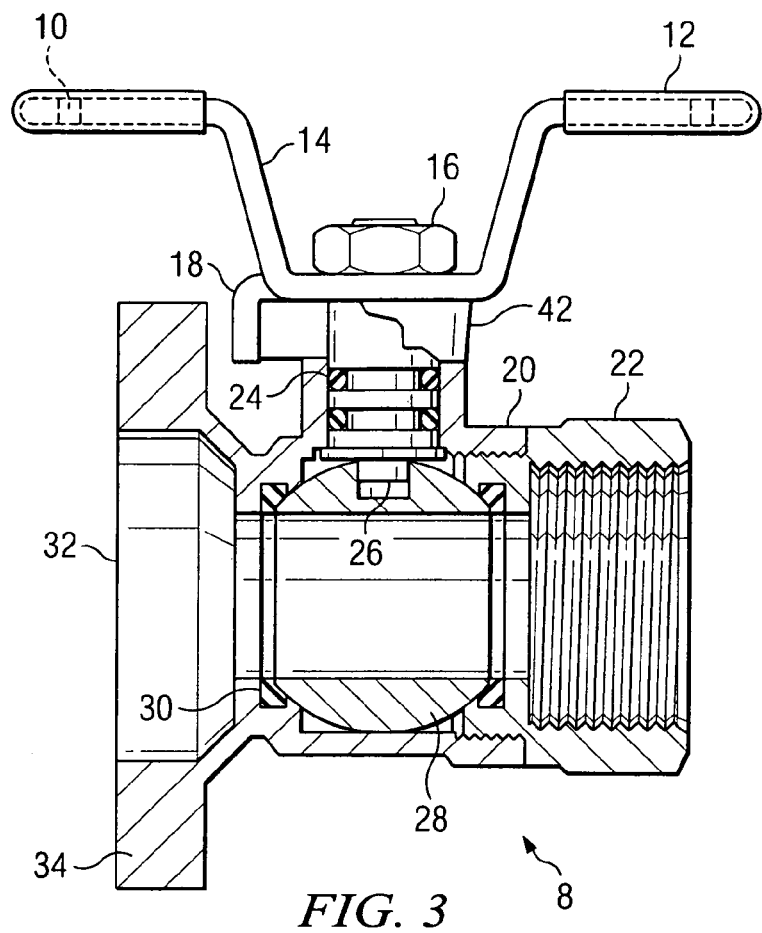
FIG. 3 is a cross-sectional view looking at the side of the valve housing of the device showing various internal components of the device including the spherical ball valve member, the blow-out proof valve stem, the blow-out proof double o-ring stem seal, and the ball seat.

As shown in FIG. 3, valve handle 14 is connected to blow-out proof valve stem 26 via stem nut 16 and is used to rotate spherical ball valve member 28 into an open or closed position. In alternate embodiments, valve handle may be connected or more generally coupled to the valve stem in other manners or at other locations but is still coupled to the spherical ball valve through its coupling to the valve stem. In the illustrated embodiment, valve stem 26 has a shoulder which is larger than the stem opening in the valve housing which substantially reduces the opportunity for the valve stem to blow out of the valve housing. Other techniques recognized by those of skill in the art may also be employed to make the valve stem "blow-out" proof. In one embodiment, a mechanical stop 18 engaged within the integrated valve housing 20 limits the rotation of valve handle 14 to the 90 degrees needed for opening and closing said spherical ball valve member 28.

An identification tag may be placed on the valve handle 14 via identification tag attachment point 10 located at each end of the valve handle 14. In one embodiment, valve handle 14 is formed from metal and has a vinyl grip 12 as depicted in FIG. 3–FIG. 8, such vinyl grip 12 being secured to valve handle 14 by means of molding the vinyl grip 12 into said valve handle 14 identification tag attachment point 10. Other grips, such as foam grips, leather grips, or even no grips may also be employed without losing the advantages of the present disclosure. The geometry of a U-shaped valve handle 14, may be described to include a base section which is coupled to spherical ball valve member 28, at least two rise sections which lift generally vertically from the base section with a rise angle for each rise section defined as the angle between the rise section and a line extended out from the base section, and a run section (or T section) for each rise section. The geometry of the valve handle 14, namely the overall height of the rise section and/or length of the run section 42 of the valve handle 14, may be adapted to fit the needs of special applications. In one embodiment illustrated, the rise angle for each rise section is preferably at least about 75 degrees, while in another embodiment illustrated, the rise angle for each rise section is about 90 degrees. In another embodiment, the rise angle may fall in the range of 75 degrees to 90 degrees. While it is preferred that the rise sections have about the same rise angles, deviation may be tolerated due to manufacturing or installation challenges or specific adaptations to fit the needs of specific applications.

In one embodiment, blow-out proof valve stem 26 of spherical ball valve member 28 is sealed against the stem opening of the valve housing with a blow-out proof double o-ring stem seal 24 for optimal sealing and performance. Blow-out proof double o-ring stem seal 24 is preferably formed from a material such as rubber. In alternate embodiments, other materials or methods of sealing this opening may equally be employed. Referring to FIG. 3, spherical ball valve member 28 is sealed via the use of ball seat 30 placed at each open end of spherical ball valve member 28 within integrated valve housing 20. Ball seat 30 is preferably made from a material such as TEFLON®, but may be made from other materials recognized by those of skill in the art.

As can be seen in FIG. 2, flange 34 of the flanged ball valve device 8 of the present disclosure is designed as an integral part of the valve housing 20 construction, and is preferably integrally formed with the valve housing. In one embodiment, the flange 34 has a smooth surface complementary to the sealing surface of the companion flange or other attachment surface of a particular pump. In one embodiment, flange 34 is shaped in order to match the shape of the flange of pumps commonly known as circulator pumps or pressure booster pumps typically used in connection with building water services. Where other applications for flanged ball valves are being considered, modified shapes more common to that industry or application may be employed.

In one embodiment, flange 34 of flanged ball valve device 8 attaches to a companion flange on a pump such as a circulator pump or a pressure booster pump by means of bolts passing through bolt hole 38. As shown in FIG. 2, bolt hole 38 of integral flange 34 of the present invention is preferably provided in slotted form in order to accommodate a variety of different pump flange sizes or orientations. While most typically the slots best accommodate similar size blots but in different positions, in some embodiments deviations in bolt size may also be accommodated by use of the slots and their sizes and configurations. The different pump flange sizes often result in different locations of bolt holes for attachment to the mating flange of the ball valve device. Additionally, some pump flanges may be of similar size, but have a different bolt hole location for other reasons. In either event, whether the basis is size or something else, the different locations of the bolt holes which should be accommodated for the valve flange to most effectively mate with the pump flange are referred to herein as different orientations of attachment openings. One of the potential drawbacks of integrally formed valve housings is that for different mating flanges, one cannot simply change out the flange to match while keeping the rest of the ball valve device. Thus, a worker may need to carry or a company may need to order and stock a larger number of full ball valve device units to accommodate different orientations of openings in the pump flanges they service. By using slotted openings in the integrally formed flange, the same integral housing may be used on more than one pump flange orientation, reducing or even in some cases eliminating some of the potential downsides of the integral housing approach. In addition, in other embodiments, flange 34 can be given any geometric profile necessary in order to make it compatible with the flange of the particular pump to which it is to be connected. Likewise, in other embodiments, the number of bolt holes 38 on integral flange 34 can be varied to match the number of bolt holes on the pump flanges to which it is designed to attach.

In one embodiment, pipe connector 22 (shown in FIG. 1, FIG. 4, and FIG. 5) of the flanged ball valve device 8 of the present disclosure may also be designed for compatibility with more than one common piping system, such as threaded pipes of either male or female thread, solder ended pipe fittings for copper and brass systems, and flexible hoses or other pipes compatible with barbed fittings. In other embodiments, pipe connector 22 of the present invention may be altered as needed to adapt to variations in male or female styles of the aforementioned piping systems common to the building and plumbing industry. In one preferred embodiment pipe connector 22 is integrally formed with valve housing 20, while in other embodiments it may be separately attached with the ability to interchange alternative pipe connectors.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

I claim:

1. A flanged ball valve device for connecting pump devices to pipe systems comprising:
    a valve housing having a pipe end, a flange end, and an integral stem opening in the valve housing in between the pipe end and the flange end;
    a flange on the flange end of the valve housing wherein the flange is an integrally formed part of the valve housing, the flange having two radially slotted openings capable of connection with a plurality of differently spaced attachment openings on connecting pump devices;
    a spherical ball valve member within said valve housing, the spherical ball valve member having a central bore and being capable of moving to an open or closed position, thereby allowing or blocking passage of fluid through the spherical ball valve member;
    a valve stem coupled to the spherical ball valve member and extending out of the valve housing through the stem opening;
    a valve handle coupled to the valve stem for rotating the spherical ball valve member into an open or closed position.

2. The flanged ball valve device of claim 1, wherein the valve handle is a U-shaped valve handle.

3. The flanged ball valve device of claim 2, wherein the U-shaped valve handle facilitates the placement of insulation material around the valve housing by minimizing the surface area of the valve housing directly blocked by the U-shaped valve handle.

4. The flanged ball valve device of claim 1, wherein the flange has a smooth surface which forms an optimal seal with the corresponding sealing surface of the pump device.

5. The flanged ball valve device of claim 4, wherein the corresponding sealing surface of the pump device is a companion flange with two openings which each can align with some portion of one of the slotted openings of the ball valve flange when the two flanges are mated for connection.

6. The flanged ball valve device of claim 1, wherein the valve housing is a one piece valve housing wherein the pipe end, the flange end, the flange on the flange end, and the stem opening are manufactured to result in a single piece valve housing.

7. The flanged ball valve device of claim 6, wherein the spherical ball valve member is a full-port ball valve.

8. The flanged ball valve device of claim 7, wherein the valve stern is a blow-out proof stern.

9. The flanged ball valve device of claim 8, wherein the region between the valve stem and the stem opening in the valve housing is sealed with a double o-ring stem seal.

10. The flanged ball valve device of claim 6, wherein the pipe connector is compatible with any one of a threaded type pipe fitting, a barbed type pipe fitting, and a solder ended type pipe fitting.

11. A flanged ball valve device for connecting pump devices to pipe systems comprising:
- a valve housing having a pipe end, a flange end, and a stem opening in the valve housing in between the pipe end and the flange end;
- a flange on the flange end of the valve housing wherein the flange is an integrally formed part of the valve housing;
- the flange having two radially slotted openings capable of connection with a plurality of different spaced attachment openings on consecutive pump devices;
- a spherical ball valve member within said valve housing, the spherical ball valve member having a central bore and being capable of moving to an open or closed position, thereby allowing or blocking passage of fluid through the spherical ball valve member;
- a valve stem coupled to the spherical ball valve member and extending out of the valve housing through the stem opening;
- a U-shaped valve handle coupled to the valve stem for rotating the spherical ball valve member into an open or closed position, wherein the U-shaped valve handle has at least two rise sections each having rise angles of at least about 75 degrees and the valve handle two rise sections have a length selected to allow a layer of insulation to be wrapped around the valve housing while allowing access to the handle.

12. The flanged ball valve device of claim 11, wherein the at least two rise sections each have rise angles of between 75 degrees and 90 degrees.

13. The flanged ball valve device of claim 11, wherein the at least two rise sections each have about the same rise angle.

14. The flanged ball valve device of claim 11, wherein the flange has two slotted openings capable of connection with a plurality of differently spaced attachment openings on connecting pump devices.

15. The flanged ball valve device of claim 14, wherein the spherical ball valve member is a full-port ball valve.

16. The flanged ball valve device of claim 15, wherein the valve stem is a blow-out proof stem.

17. The flanged ball valve device of claim 11, further comprising a layer of insulation wrapped around the valve housing, the layer of insulation having a thickness, wherein the valve handle two rise sections have a length greater than the thickness and extend through the layer of insulation.

18. A flanged ball valve device for connecting pump devices to pipe systems comprising:
- a one piece valve housing having a pipe end, a flange end, a flange on the flange end and an integral stem opening in the valve housing in between the pipe end and the flange end;
- a flange on the flange end of the valve housing wherein the flange is an integrally formed part of the valve housing, the flange having two radially slotted openings capable of connection with a plurality of differently spaced attachment openings on connecting pump devices;
- a spherical ball valve member within said valve housing, the spherical ball valve member having a central bore and being capable of moving to an open or closed position, thereby allowing or blocking passage of fluid through the spherical ball valve member;
- a valve stem coupled to the spherical ball valve member and extending out of the valve housing through the stem opening;
- a U-shaped valve handle coupled to the valve stem for rotating the spherical ball valve member into an open or closed position, wherein the U-shaped valve handle has at least two rise sections each having rise angles of at least about 75 degrees.

19. The flanged ball valve device of claim 18, further comprising a layer of insulation wrapped around the valve housing, the layer of insulation having a thickness, wherein the valve handle two rise sections have a length greater than the thickness and extend through the layer of insulation.

20. The flanged ball valve device of claim 18, wherein the valve handle two rise sections have a length selected to allow a layer of insulation to be wrapped around the valve housing while allowing access to the handle.

* * * * *